Patented Jan. 20, 1925.

1,523,580

UNITED STATES PATENT OFFICE.

ROBERT CALVERT, OF LOMPOC, CALIFORNIA, ASSIGNOR TO THE CELITE COMPANY, OF LOS ANGELES, CALIFORNIA, A CORPORATION OF DELAWARE.

SOLIDIFIED FUEL.

No Drawing.   Application filed September 13, 1922.   Serial No. 588,075.

*To all whom it may concern:*

Be it known that I, ROBERT CALVERT, a citizen of the United States, residing at Lompoc, in the county of Santa Barbara and State of California, have invented a new and useful Solidified Fuel, of which the following is a specification.

This invention relates to a fuel containing alcohol or other combustible liquid, and the main object of the invention is to provide such a fuel in solid form, for the sake of greater convenience and safety in transportation, storage and use.

My invention comprises a body or mass of diatomaceous earth (otherwise known as infusorial earth, tripoli, fossil flour, or kieselguhr) and a liquid fuel, such as alcohol, absorbed in such body or mass. Other constituents may also be present, for example, thickening substances, such as soap, which are mixed with the alcohol and the mixture heated so as to render it fluid, and the resulting composition of soap and alcohol being mixed with diatomaceous earth and allowed to cool, forming a solid fuel.

My improved solid fuel may be packed in any suitable container, such as a can or carton, of metal or other material and of any convenient size and shape; said container being provided with a removable top or cover, so that on removing such cover the contents of the container may be ignited and the alcohol or other liquid fuel constituent thereof burnt without removing the fuel from the container. In producing such a fuel package, the liquid fuel may be mixed with the diatomaceous earth before packing into the container, or the diatomaceous earth may be packed into the container and the liquid fuel poured thereinto so as to be absorbed by the porous body of diatomaceous earth.

My invention may be carried out in the following manner: Diatomaceous earth, in the form of a dry powder, for example, 100 mesh and finer, is packed into a tin can of say about one-fourth pint capacity, and alcohol is then poured into the can in sufficient amount to saturate the diatomaceous earth in the can. Uniformity of mixing is secured by stirring. The cover is then placed on the can and sealed in any suitable manner.

A convenient mixture consists of 30 grams of powdered diatomaceous earth and 70 grams denatured alcohol. So great is the porosity of the diatomaceous earth that 30 grams thereof occupies a volume of 125 cc. After absorbing 87 cc. alcohol the entire mass of diatomaceous earth occupies a net volume of 10 cc., the entire total volume of the stated quantities of diatomaceous earth and alcohol, when mixed, being only 97 cc. The absorption of alcohol is so thorough that the mixture will not flow from an inverted can either when cold or when hot.

If too little alcohol is used, the mixture with diatomaceous earth is dusty and inclined to crumble easily and fall in small lumps or as dust from an inverted can. If too much alcohol is added, the mixture flows as a liquid. In any case, the amount of alcohol used should be properly proportioned so as to avoid either of these extreme conditions.

Instead of powdered diatomaceous earth I may use a block of diatomaceous earth cut or formed to desired shape and size. Such a block absorbs alcohol slightly less readily than the powdered diatomaceous earth.

I may also carry out my invention by forming a mixture of alcohol and a soap, such as a stearate of an alkali metal or alkaline earth metal, the mixture being heated sufficiently to enable it to flow freely and then poured into the diatomaceous earth contained in a can. In this application of the invention just enough soap should be used to convert the alcohol to a solid gel on cooling, and the diatomaceous earth is saturated with the hot liquid mixture. A suitable mixture consists of 29 parts diatomaceous earth, 68 parts alcohol and 3 parts soap, by weight. This form of my invention has the advantage over the alcohol soap-mixture now in use that the body of diatomaceous earth serves to hold the fuel in the can even when the fuel is hot. The mixture of soap and alcohol alone melts when in use and if the container is accidentally overturned while the fuel is burning the melted fuel runs out and is liable to set fire to other objects. By reason of the presence of the diatomaceous earth, constituting a solid porous incombustible mass, the combustible constituent of the fuel is held in the can under all conditions.

By the term alcohol I mean to include not only grain alcohol but also denatured alcohol, wood alcohol and propyl alcohols. Other combustible liquids may also be used, for example, various hydrocarbons, (kerosene etc.,) ethers, esters, ketones etc., or mixtures of any of the liquids hereinbefore referred to. The proportion of liquid fuel to the diatomaceous earth varies with the liquid used and with the fineness of the diatomaceous earth, but in any case it will suffice to saturate the diatomaceous earth with the liquid.

What I claim is:

A solidified fuel containing approximately twenty nine parts diatomaceous earth, sixty eight parts of alcohol and three parts of soap, by weight.

In testimony whereof I have hereunto subscribed my name this 5th day of September 1922.

ROBERT CALVERT.